Sept. 25, 1951 E. H. KRAUSE ET AL 2,568,750
DISCRIMINATOR CIRCUIT
Filed Nov. 13, 1945 2 Sheets-Sheet 1
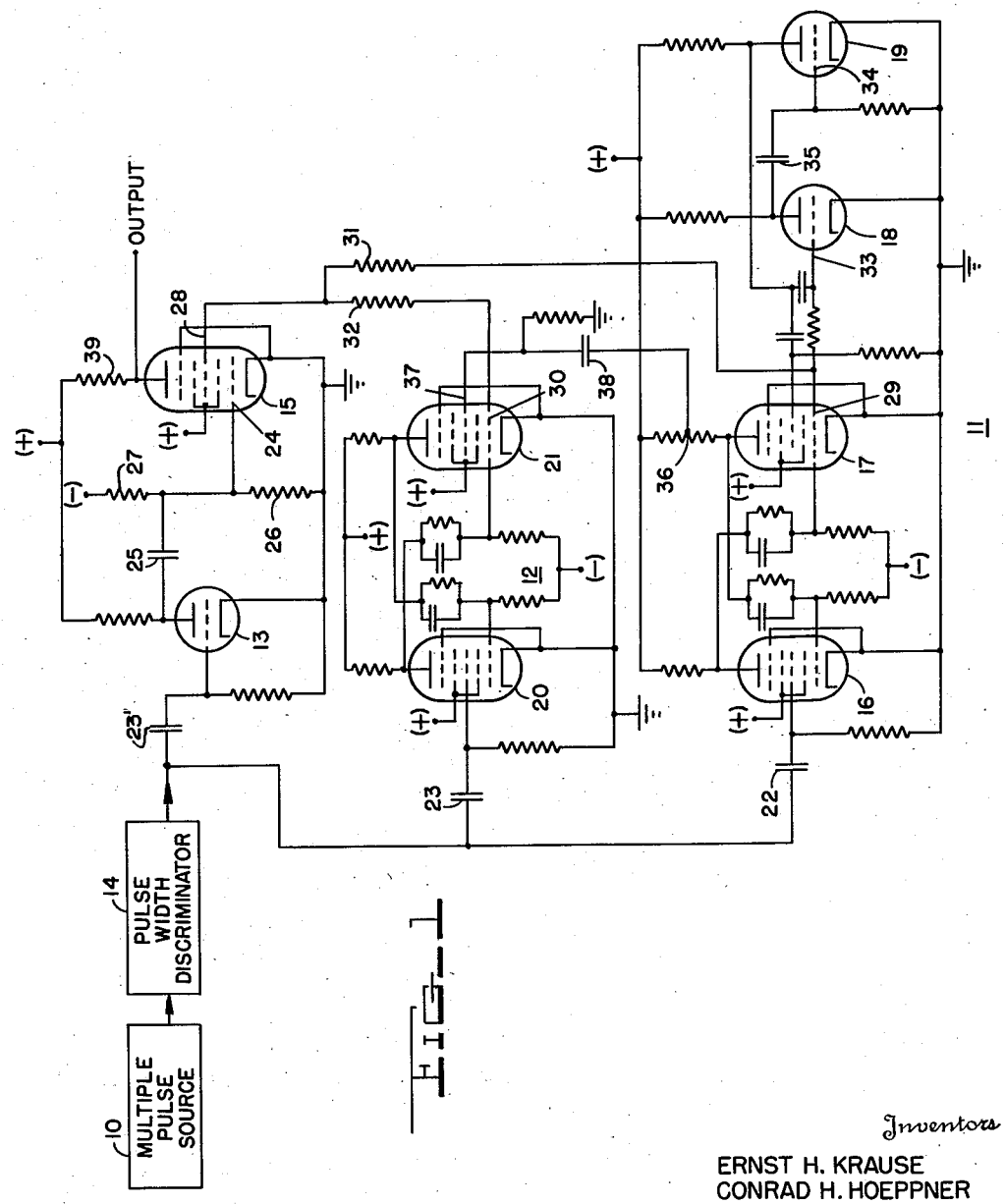
Inventors
ERNST H. KRAUSE
CONRAD H. HOEPPNER
By Ralph L. Chappell
Attorney Sept. 25, 1951  E. H. KRAUSE ET AL  2,568,750
DISCRIMINATOR CIRCUIT
Filed Nov. 13, 1945  2 Sheets-Sheet 2
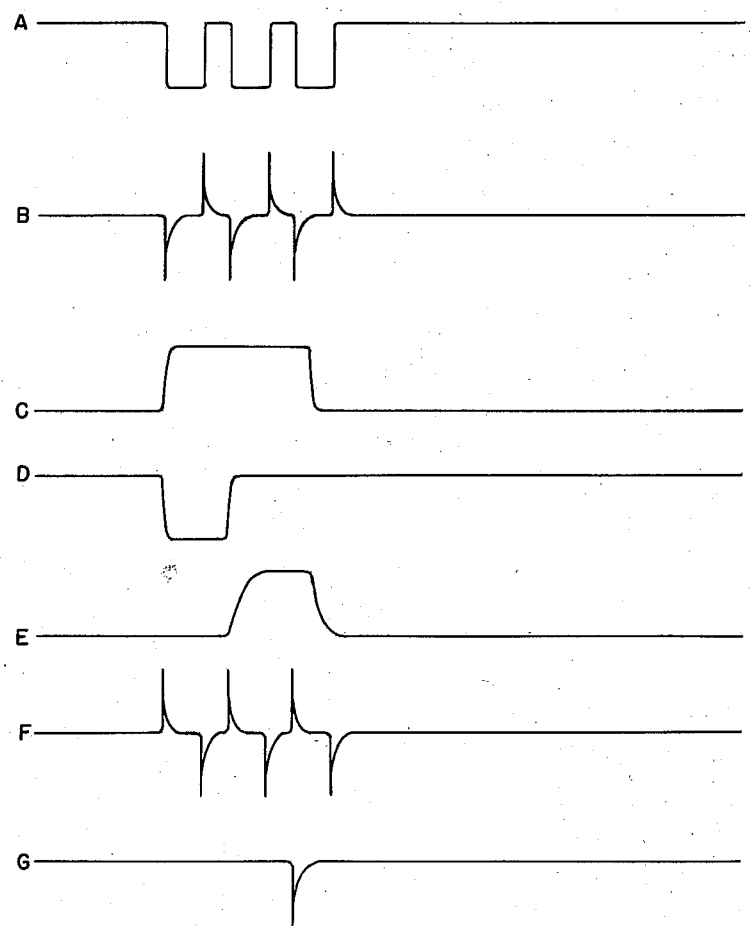
Inventors
ERNST H. KRAUSE
CONRAD H. HOEPPNER Patented Sept. 25, 1951

2,568,750

UNITED STATES PATENT OFFICE 2,568,750

DISCRIMINATOR CIRCUIT

Ernst H. Krause, Cheverly, Md., and Conrad H. Hoeppner, Washington, D. C.

Application November 13, 1945, Serial No. 628,333

7 Claims. (Cl. 177—353)

(Granted under the act of March 3, 1883, as amended April 30, 1928; 370 O. G. 757)

This invention relates to electrical signal waveform discriminator circuits and in particular to selector circuits responsive to a signal waveform consisting of a plurality of pulses occurring during a predetermined period of time.

In radio and the allied arts, interference is frequently experienced between two signal sources operating at the same frequency. A similar situation may exist in wired communication where simultaneous transmission of several messages over a single channel is desired. Such interference may be substantially reduced by imparting some particular characteristic to the signal emitted by the desired source and rendering the receiving system solely responsive to that particular signal characteristic.

One form of special characteristic which may be imparted to pulsed operation involves the emission of a repetitive or non-repetitive multiple pulse signal in which the duration of each pulse group is a small percentage of the time separating each pulse group. In this type of operation, a repetitive or non-repetitive pulse group consisting of two or more individual pulses occurring during a predetermined period of time is emitted by the signal source. The receiving system employed is rendered solely responsive to this multiple pulse signal group by means of special selector circuits incorporated therein.

It is an object of this invention to provide a selector system for use in a multiple pulse receiving unit which will deliver an output signal upon the application thereto of a preselected number of pulses occurring during a predetermined period of time.

Another object of this invention is to provide a selector system which is not responsive to single pulse signals or to multiple pulse signals of other than a predetermined number or to multiple pulse signals occurring over a period of time longer than a preselected amount.

Other objects and features of the present invention will become apparent upon a careful consideration of the accompanying drawing and following description.

In the drawing:

Fig. 1 shows a typical embodiment of the basic features of the invention as applied to a three pulse selector, and Fig. 2 shows certain waveforms taken to illustrate more fully the operation of the circuit of Fig. 1.

The series of three negative input pulses emanating from the source 10 and shown in waveform A of Fig. 2 is applied to the electronic switches 11, 12 and the inverter 13 through a pulse width and amplitude discriminator 14.

Discriminator 14 serves primarily to reject individual and group pulses that have less than a predetermined amplitude or width and may take any form known to the prior art. A typical discriminator is that shown in a copending application of Conrad H. Hoeppner, Serial No. 608,804, filed August 3, 1945, now Patent No. 2,534,264, dated December 19, 1950.

The electronic switch circuit 11 comprises two trigger circuits. A first trigger circuit consisting of tubes 16, 17 is of a type having two stable conductive states. Multiple grid tubes, for example, of the type known as 6SA7, are employed and connected so that a change of conductive state can be initiated or brought about only by the application of a negative pulse to a control element of the conducting tube. A second trigger circuit comprising tubes 18, 19 connected as a one shot multivibrator is a time determining element, establishing the maximum period over which the input three pulse group must occur to produce an output signal.

Electronic switch 12 comprises a trigger circuit 20, 21 also of the above type (16, 17) having multiple grid tubes with two conductive states and capable of initiation of trigger action solely by negative pulses applied to a control element of the conducting tube.

The series of negative pulses is applied to the trigger tubes 16, 20 through coupling capacitances 22, 23 respectively, and are also applied through capacitor 23' to the inverter tube 13. Tube 13 is normally conducting heavily but is cut off by the negative pulses. The resulting series of positive pulses produced at the plate of tube 13 is then applied to control grid 24 of the multiple grid coincidence tube 15 by means of the coupling capacitance 25. The plate of coincidence tube 15 is normally held non-conductive by a negative potential maintained at grid 24 from the voltage divider 26, 27 and by a negative potential maintained at grid 28 from grid 29 of tube 17 and grid 30 of tube 21 through resistances 31, 32, respectively. The negative potential maintained at grids 29 and 30 is such that with either of tubes 16, 20 conducting, plate current cannot flow in tube 15. The coupling networks associated with capacitances 22, 23, 25 are of a short time constant or "differentiating" type so that sharp peaks occurring in coincidence with the leading and trailing edges of the pulses are applied to the respective tubes for more positive triggering action.

In the operation of the electronic switches, an initial conduction condition is assumed wherein tubes 16, 19, 21 are conducting and tubes 17, 18, 20 are nonconducting. The differentiated negative voltage peak produced in time coincidence with the leading edge of the first pulse from source 10 stops conduction by tube 16 thus raising the potential of grid 29 of tube 17 so that tube 17 is brought to conduction.

As the potential of grid 29 is thus raised, grid 33 of tube 18 is also raised permitting conduction by tube 18. Grid 34 of tube 19 is thereby driven far negative so that tube 19 is rendered non-conducting to remain in that state until the coupling capacitance 35 discharges sufficiently to permit conduction by tube 19.

Simultaneous with the initiation of conduction by tube 17, the potential drop produced across a part of the tapped load resistor 36 is applied to grid 37 of tube 21 through capacitance 38 so that tube 21 is rendered non-conductive and tube 20 conductive. To facilitate this latter action it is generally desirable that the time constant of the coupling circuit including capacitance 38 be somewhat longer than the time constant of the coupling circuit including capacitance 23.

After the first pulse the switch circuits are therefore changed to a condition wherein 17, 18, 20 are conducting and 16, 19, 21 cut off.

The differentiated negative voltage peak produced in time coincidence with the leading edge of the second pulse does not affect the non-conducting tube 16 of switch 11 but does stop conduction by tube 20 of switch 12, thereby raising the potential of grid 30 so that tube 21 is rendered conducting. Thus both grids 29 and 30 are raised in potential to a point near zero bias.

With the cut off bias thus removed from grid 28 of tube 15, the leading edge of the third pulse, inverted and differentiated, raises grid 24 above cut off potential producing a momentary flow of plate current in tube 15 and a negative voltage pulse across the plate load resistor 39. The third pulse, however, does not affect the switch circuits 11, 12 because both tubes 16 and 20 are non-conductive.

With the expiration of a predetermined interval of time, the coupling capacitance 35 in the grid circuit of tube 19 discharges sufficiently to permit conduction by tube 19. When this occurs, the resulting drop in the plate voltage of tube 19 stops conduction by tubes 17 and 18 so that the switch circuits are returned to the assumed initial conditions in readiness for a second three pulse group.

It should be noted that although the action of the trigger circuits is described as occurring instantaneously, actually there is some delay in their operation, and further delay in the charging of the distributed capacitance associated with grid 28 of tube 15 through the large resistors 31 and 32 which may be, typically, one megohm in size.

It is for this reason that the differentiated second pulse, which eventually removes cut off bias from grid 28 does not produce an output signal when it raises grid 24 above cut off.

Waveforms produced at selected points in the circuit during normal operation as herein described are shown in Fig. 2. Waveform A, as previously described, shows the multiple pulse group emanating from source 10. Waveform B shows the differentiated signal applied through capacitances 22, 23 to tubes 16 and 20. Waveform C is a representation of the gating signal produced at grid 29 of tube 17. Waveform D represents the gating signal produced at grid 30 of tube 21. Waveform E shows the resulting gating signal applied to grid 28 of tube 15. Waveform F shows the inverted and differentiated signal applied to grid 24 of tube 15 and waveform G shows the single pulse output from the plate of tube 15.

From the foregoing discussion it is apparent that considerable modification of the features of this invention are possible, and while the device herein described and the form of apparatus for the operation thereof, constitutes a preferred embodiment of the invention, it is to be understood that the invention is not limited to this precise device and form of apparatus, and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. A selector system providing response to a predetermined multiple pulse signal; comprising, a multiciplicity of electronic trigger circuits having dual conductivity states, means operating each of said electronic trigger circuits to a reference conductivity state in response to input pulses in number one less than the number of pulses in the signal, coincidence means connected to said electronic trigger circuits for delivering an output signal in response to a final input pulse occurring with said electronic trigger circuits in their reference conductivity state, and time determining means changing at least one of said electronic trigger circuits from its reference conductivity state a predetermined time interval after the initial pulse of the multiple pulse signal.

2. A selector circuit for delivering an output signal in response to the application of an input signal having a predetermined waveform; comprising, a pulse width and amplitude discriminator, a multiplicity of electronic trigger circuits having dual conductivity states, means operating each of said electronic trigger circuits to a reference conductivity state in response to discriminator output pulses having a desired amplitude and duration, said pulses in number one less than the total number of pulses in the group, coincidence means connected to said electronic trigger circuits for delivering an output signal in response to a final discriminator output pulse received when all of said electronic trigger circuits are in their reference conductivity states, and time determining means changing at least one of said electronic trigger circuits from its reference conductivity state a predetermined time interval after the initial pulse signal of the multiple pulse signal.

3. A triple pulse signal discriminator for delivering selective output only upon the application thereto of three individual pulses occurring during a predetermined length of time; comprising, first and second electronic trigger circuits, each of said circuits having two conductive states, means operating said electronic trigger circuits to a reference conductivity state in response to a first two of said three input pulses, coincidence means coupled to said trigger circuits for delivering an output signal in response to the arrival of a third pulse with said electronic trigger circuits in their reference conductivity state, and time determining means moving at least one of said electronic trigger circuits from its reference conductivity state a predetermined interval of time after the arrival of the first pulse of the signal.

4. A triple pulse signal discriminator circuit for delivering selective output only upon the application thereto of three individual pulses occurring during a predetermined length of time; comprising, a first electronic trigger circuit having two conductivity states, means operating said electronic trigger circuit to a reference conductivity state in response to a first pulse of said triple pulse signal, time determining means coupled to said trigger circuit and operable therewith for moving said trigger circuit from said reference position a predetermined time interval after said first pulse, a second electronic trigger circuit, means operating said second electronic trigger circuit to a reference position in response to a second pulse of the triple pulse signal, and coincidence means connected to said electronic trigger circuits and to the source of pulse signals for delivering an output signal upon reception of a third pulse during a period when all of said electronic trigger circuits are in their reference position.

5. A triple pulse signal discriminator circuit for delivering an output signal in response to the application thereto of three individual pulses occurring during a predetermined length of time; comprising, a first electronic trigger circuit having two conductivity states, differentiating coupling means operating said first electronic trigger circuit to a reference conductivity state in response to a first pulse of said signal, a second electronic trigger circuit having one stable and one unstable conductivity state, means operably connecting said first and second electronic trigger circuits to initiate the unstable conductivity state in said second electronic trigger circuit in response to the operation of said first electronic trigger circuit to its reference conductivity state and to change said first electronic trigger circuit from its reference state upon return of said second electronic trigger circuit to its stable state, a third electronic trigger circuit having two stable conductivity states, differentiating coupling means operating said third electronic trigger circuit to a reference position in response to a second input pulse, and coincidence means connected to said first and third electronic trigger circuits and to the source of pulse signals for delivering an output signal upon reception of a third pulse during a period when said electronic trigger circuits are in their reference positions.

6. A selector circuit for delivering an output signal in response to the application of an input signal having a predetermined waveform consisting of a plurality of pulses; comprising, a pulse width and amplitude discriminator delivering an output pulse only upon the application of an input pulse having an amplitude and a duration greater than predetermined values, a first electronic trigger circuit having two conductivity states, differentiating coupling means operating said first electronic trigger circuit to a reference conductivity state in response to a first pulse of said signal, a second electronic trigger circuit having one stable and one unstable conductivity state, means operably connecting said first and second electronic trigger circuits to initiate the unstable conductivity state in said second electronic trigger circuit in response to the operation of said first electronic trigger circuit to its reference conductivity state and to change said first trigger circuit from its reference state upon return of said second electronic trigger circuit to its stable state, a third electronic trigger circuit having two stable conductivity states, differentiating coupling means operating said third electronic trigger circuit to a reference position in response to a second input pulse and coincidence means connected to said first and third electronic trigger circuits and to the source of pulse signals for delivering an output signal upon reception of a third pulse during a period when said electronic trigger circuits are in their reference position.

7. A selector system providing response to a predetermined multiple pulse input signal comprising, a multiplicity of electronic trigger circuits equal in number to one less than the number of pulses comprising the desired input signal each having dual conductivity states, means supplying said input signals to said trigger circuits to operate the same to a reference conductivity state in response to input pulses in number, one less than the number of pulses in the signal, coincidence circuit means connected to receive said input signal and to said electronic trigger circuits for delivering an output in response to a final input pulse occurring while said electronic circuits are in their reference conductivity state.

ERNST H. KRAUSE.
CONRAD H. HOEPPNER.

REFERENCES CITED

The following references are of record in the file of this patent:

UNITED STATES PATENTS

| Number | Name | Date |
| --- | --- | --- |
| 1,967,396 | Chauveau | July 24, 1934 |
| 2,403,561 | Smith | July 9, 1946 |
| 2,411,091 | Henderson | Nov. 12, 1946 |

FOREIGN PATENTS

| Number | Country | Date |
| --- | --- | --- |
| 355,705 | Great Britain | Aug. 24, 1931 |